US009828678B2

(12) United States Patent
Fouda-Onana et al.

(10) Patent No.: US 9,828,678 B2
(45) Date of Patent: Nov. 28, 2017

(54) METHOD FOR DEPOSITING A METAL ONTO A POROUS CARBON LAYER

(75) Inventors: Frederic Fouda-Onana, Le Moule (FR); Nicolas Guillet, Chatuzange le Goubet (FR)

(73) Assignee: Commissariat A L'Energie Atomique Et Aux Energies Alternatives, Paris (FR)

( * ) Notice: Subject to any disclaimer, the term of this patent is extended or adjusted under 35 U.S.C. 154(b) by 742 days.

(21) Appl. No.: 13/497,115

(22) PCT Filed: Sep. 20, 2010

(86) PCT No.: PCT/FR2010/000632
§ 371 (c)(1),
(2), (4) Date: Sep. 14, 2012

(87) PCT Pub. No.: WO2011/033196
PCT Pub. Date: Mar. 24, 2011

(65) Prior Publication Data
US 2012/0325672 A1 Dec. 27, 2012

(30) Foreign Application Priority Data
Sep. 21, 2009 (FR) ..................................... 09 04494

(51) Int. Cl.
| C23C 18/44 | (2006.01) |
| C25D 5/02 | (2006.01) |
| C25D 5/54 | (2006.01) |
| C23C 18/16 | (2006.01) |
| C25D 3/50 | (2006.01) |
| H01M 4/88 | (2006.01) |

(52) U.S. Cl.
CPC ............ *C23C 18/44* (2013.01); *C23C 18/165* (2013.01); *C23C 18/1644* (2013.01); *C25D 3/50* (2013.01); *C25D 5/02* (2013.01); *C25D 5/54* (2013.01); *H01M 4/8807* (2013.01); *H01M 4/8842* (2013.01); *H01M 4/8853* (2013.01)

(58) Field of Classification Search
CPC ........ B01J 23/40; H01M 4/00; H01M 4/8842; C22C 5/04; C23C 18/44
USPC ............ 205/101, 158; 502/180–182; 429/40
See application file for complete search history.

(56) References Cited

U.S. PATENT DOCUMENTS

| 3,235,473 | A | * | 2/1966 | Le Duc ........................ 205/161 |
| 3,704,208 | A | * | 11/1972 | Russo ................... C23C 18/24 |
| | | | | 205/118 |
| 6,258,239 | B1 | | 7/2001 | Stab et al. |
| 6,492,299 | B1 | * | 12/2002 | Couves et al. ............... 502/339 |
| 6,596,149 | B2 | * | 7/2003 | Horii ............................ 205/123 |
| 7,438,885 | B1 | * | 10/2008 | Seal ...................... B82Y 30/00 |
| | | | | 423/447.1 |
| 7,468,340 | B2 | * | 12/2008 | Ohya et al. .................. 502/180 |
| 7,504,534 | B2 | * | 3/2009 | Haupfear et al. ............... 562/17 |
| 2005/0181268 | A1 | * | 8/2005 | Ohya .................. H01M 4/8605 |
| | | | | 429/483 |
| 2006/0083852 | A1 | * | 4/2006 | Jeon ............................ 427/115 |
| 2009/0220682 | A1 | * | 9/2009 | Monnier ............. C23C 18/1641 |
| | | | | 427/113 |

FOREIGN PATENT DOCUMENTS

WO WO 2004/095614 A2 11/2004

OTHER PUBLICATIONS

International Search Report and Written Opinion from International Patent Application No. PCT/FR2010/000632m dated Dec. 10, 2010.

* cited by examiner

Primary Examiner — Brian W Cohen
(74) Attorney, Agent, or Firm — Alston & Bird LLP

(57) ABSTRACT

The invention relates to a method for depositing a metal M1 onto a carbon layer, as well as to a method for manufacturing an electrode for fuel cells and to a method for manufacturing a fuel cell. The method for depositing a metal M1 onto a porous carbon layer according to the invention includes a step of depositing said metal M1 by means of the electrochemical reduction of an electrolytic solution of a salt of the metal M1, and, prior to said step of depositing the metal M1 by means of electrochemical reduction, a step of depositing a metal M2 by means of chemical reduction using a reducing gas of a salt of the metal M2, the thermodynamic equilibrium potential between the ionic form of the salt of M2 and M2, $E^{eq}_{ionic\ form\ of\ the\ salt\ of\ M2/M2}$ being greater than the thermodynamic equilibrium potential between the ionic form of the salt of M1 and M1, $E^{eq}_{ionic\ form\ of\ the\ salt\ of\ M1/M1}$. The invention can be used, in particular, in the field of fuel cells.

8 Claims, No Drawings

METHOD FOR DEPOSITING A METAL ONTO A POROUS CARBON LAYER

FIELD OF THE INVENTION

The invention relates to a process for the deposition of a metal M1 on a layer of carbon, and also to a process for the manufacture of an electrode for fuel cells and to a process for the manufacture of a fuel cell comprising this deposition process.

BACKGROUND OF THE INVENTION

Fuel cells (FCs) are systems which convert the heat energy of the fuel, generally hydrogen or an alcohol, to electrical energy via two electrochemical reactions.

One of these reactions is the reaction for oxidation of the fuel ($H_2$ or alcohols) at the anode, which generates electrons by the following reaction:

$$H_2 \rightarrow 2(H^+ + e^-).$$

The other reaction is the reaction for reduction of the oxidant, pure $O_2$ or air, which takes place at the cathode and which generates water by the following reaction:

$$\tfrac{1}{2}O_2 + 2(H^+ + e^-) \rightarrow H_2O.$$

This reaction is a catalyzed reaction, generally catalyzed by platinum which is deposited on the electrode, forming what is referred to as an active layer.

Thus, fuel cells can only operate if the ionic and electrical charges are transported as far as the cathode.

The transfer of the proton charges formed at the anode is provided in general by a membrane composed of a proton-exchange polymer, for example made of Nafion®, which is a copolymer based on sulfonated tetrafluoroethylene polymer. In the case of the Nafion®, this transfer is provided by virtue of its sulfonated chains.

The conduction of the electrons takes place for its part via electric wires and makes it possible to convey the electrons as far as the cathode.

The work carried out by the displacement of these electrons provides the energy necessary for the operation, for example, of an electrical appliance.

Nevertheless, the low kinetics of the oxygen reduction reaction (ORR), which takes place at the cathode, results in the electrodes being charged with a high content of catalyst, which is generally platinum. This platinum content is of the order of 0.6 to 0.8 mg/cm².

These high charges significantly increase the cost of the fuel cells and make these cells less competitive in the face of conventional thermal systems, in particular for motor vehicle applications.

Furthermore, the conventional methods for the preparation of the electrodes have the major disadvantage of having a low degree of use of the platinum. This means that the random distribution of the platinum particles in the active layer does not make it possible to optimize the reaction surface for the oxygen reduction reaction taking place at the cathode.

This means, a contrario, that a "nano-organized" distribution should make it possible to reduce the charging with platinum to approximately from 0.15 to 0.2 mg/cm² while retaining a high catalytic performance, for example for a motor vehicle application.

As indicated in the cathodic equation of the ORR, the degree of use of the platinum is at a maximum if the combined catalytic sites correspond to the encounter of a triple contact between the gas, the electrons and the protons.

The commonest method for the preparation of a fuel cell electrode consists in impregnating a carbon powder with a solution of metal salts and in then reducing the metal ions with reducing agents, such as sodium borohydride, formaldehyde, ethylene glycol, and the like, this carbon-based solution subsequently being filtered and subsequently being subjected to a heat treatment.

The powder obtained comprises metal nanoparticles (generally platinum nanoparticles) with sizes of between 2 and 5 nm. This catalytic powder thus obtained is mixed with water, isopropanol and a solution of the proton-exchange polymer, for example made of Nafion®, and becomes an ink which is applied to a diffusion layer to become a gas diffusion electrode. These prepared electrodes (one for the anode and one for the cathode) are assembled on either side of a membrane composed of a proton-exchange polymer solution, for example made of Nafion®, and hot pressed in order to obtain a membrane electrode assembly (MEA).

These electrodes have active layers with a thickness of 50 µm, whereas only the first micrometers close to the membrane composed of a proton-exchange polymer, for example made of Nafion®, actively participate in the electrochemical reactions.

In order to overcome this problem, provision has been made to use an electrochemical deposition method which makes it possible to concentrate the active layer in the first micrometers of the diffusion layer and to avoid dispersing catalytic particles in the body of the electrode rather than at the surface.

Provision has also been made to use deposition techniques, such as physical vapor deposition or chemical vapor deposition or metalorganic vapor phase deposition, to form the active layer.

Although these techniques have been shown useful for small systems, they cannot be readily envisaged for larger systems due to the cumbersomeness of the experimental means to be used and the cost related to these processes.

Thus, the electrochemical deposition technique is an economically viable and simple to employ process which makes it possible to reduce the charging with platinum of FC electrodes.

However, in terms of localization, this technique, although it makes it possible to make sure that the catalyst is found in regions accessible to the electrons, does not make it possible to make sure that the catalyst is accessible to the gas and to the protons.

SUMMARY OF THE INVENTION

The invention aims at overcoming the disadvantages of the techniques of the prior art by providing a process for the deposition of a metal M1, in particular of a catalyst, and more particularly of platinum, on a layer of porous carbon, which makes possible the localization of the particles of metal M1 in regions accessible not only to the electrons but also to the gases.

To this end, the invention provides a process for the deposition of a metal M1 on a layer made of porous carbon comprising a step of deposition of said metal M1 by electrochemical reduction of an electrolytic solution of a salt of the metal M1, characterized in that it comprises, before said step of deposition of the metal M1 by electrochemical reduction, a step of deposition of a metal M2 by chemical reduction, by a reducing gas, of a salt of the metal M2, the thermodynamic equilibrium potential between the ionic form of the salt of M2 and M2, $E^{eq}_{ionic\ form\ of\ the\ salt\ of\ M2/M2}$, being greater than the thermodynamic equilibrium potential between the ionic form of the salt of M1 and M1, $E^{eq}_{ionic\ form\ of\ the\ salt\ of\ M1/M1}$.

In a first embodiment of the process of the invention, the reducing gas is hydrogen $H_2$ or CO, which can be combined with a carrier gas, such as $N_2$ or Ar.

In a second embodiment of the process of the invention, the reducing gas is an $H_2+CO$ mixture, which can be combined with a carrier gas, such as $N_2$ or Ar.

In all cases, preferably, the metal M1 is platinum (Pt).

In this case, preferably, the metal M2 is palladium (Pd).

The invention also provides a process for the manufacture of a fuel cell electrode, characterized in that it comprises a step of deposition of a metal M1 on a layer made of porous carbon according to the process of the invention.

The invention also provides a process for the manufacture of a fuel cell, characterized in that it comprises a step of manufacture of an electrode according to the process of the invention.

Finally, the invention provides a process for the manufacture of a fuel cell, characterized in that it comprises a step of deposition of a metal M1 on a layer of porous carbon according to the process of the invention.

DETAILED DESCRIPTION OF THE INVENTION

A better understanding of the invention will be obtained and other characteristics and advantages of the invention will become more clearly apparent on reading the following explanatory description.

The process for the deposition of a metal of the invention is a process for the deposition of a metal M1 on a layer of porous carbon which comprises a step of sweeping out with a gas in order to deposit the grains of metal M1. This is because, if the grains are deposited by a gas stream, then they will necessarily be localized at spots accessible to the gas. However, as a complete deposition cannot be envisaged by this technique, due to the cumbersomeness of the appliances to be employed and the costs related to these processes, the invention provides for the manufacture, first, of seeds made of nanoparticles of metal, M2, if possible also exhibiting a catalytic activity, and then for the deposition of the metal M1 itself by the conventional technique of electrochemical deposition of the metal M1.

In other words, the process for the deposition of metal M1 on a layer made of porous carbon according to the invention is characterized by, first of all, the deposition, by a chemical reaction between a reducing gas and a solution of a metal M2, different from the metal M1, and then the deposition by a reaction for electrochemical reduction of the ions of the desired metal M1.

The presence of the metal seeds formed during the chemical reduction by the reducing gas ensures that the sites where these seeds are formed are accessible to the gases. Then, on carrying out an electrochemical reduction by choosing a weak current or a weak potential, the seeds become active sites for the growth of the particles of the metal M1. This growth ensures that the metal M1 is present at the sites accessible to the electrons and to the gases.

In the case of the manufacture of a fuel cell electrode and when the metal M1 is platinum, two conditions out of three are then adhered to, instead of one out of three by the conventional electrochemical deposition method. Furthermore, the random nature of the dispersion of active sites by the conventional impregnation method is overcome.

Preferably, in the process of the invention, the reducing gas is hydrogen ($H_2$) or a mixture of hydrogen with carbon monoxide ($H_2+CO$).

It is necessary, in all cases, for the salt of the metal M2 to be capable of being reduced by the reducing gas chosen.

It is also necessary for the metal M1 to be deposited on the seeds of metal M2 and not on the carbon. These two conditions imply that a relationship has to be adhered to between the equilibrium potentials of the metal M1 and the metal M2.

The first of these conditions is that the thermodynamic equilibrium potential of the ionic form of the metal M2/metal M2 pair be greater than the equilibrium potential of the ionic form of the reducing gas/reducing gas pair. The second condition is that the thermodynamic equilibrium potential of the ionic form of the salt of the metal M2/metal M2 pair, $E^{eq}_{ionic\ form\ of\ the\ salt\ of\ M2/M2}$, be greater than the thermodynamic equilibrium potential of the ionic form of the salt of the metal M1/metal M1 pair, $E^{eq}_{ionic\ form\ of\ the\ salt\ of\ M1/M1}$.

This second condition makes it possible to ensure that the metal M1 crystallizes on the seeds of the metal M2 and not on the carbon.

If this second condition is adhered to, an energy barrier known as overvoltage is overcome.

Preferably, in the process of the invention, the metal M1 is platinum and the metal M2 is palladium. In this case, the deposition process of the invention is a process for the manufacture of a fuel cell electrode.

Preferably, the reducing gas is, in this case, hydrogen or CO. However, it can also be a mixture of hydrogen and carbon monoxide. This is because all these gases indeed adhere, for Pt and Pd, to the relationships of the potentials. They can be used as a mixture with argon (Ar) or nitrogen ($N_2$) or a mixture of argon and nitrogen as carrier gas(es).

However, as carbon monoxide is known as a gas which is easily absorbed and which is thus regarded as a poison for fuel cells, it will preferably be used in a small amount.

Furthermore, the presence of carbon monoxide in $H_2$ results in finer metal particles of palladium than in the case where only hydrogen is used as the carbon monoxide makes it possible to limit the growth of the palladium particles, and thus a better dispersion of the Pd seeds and thus, in the end, of the Pt particles are obtained. For example, 0.005% by volume, with respect to the total volume of $H_2+CO$, of CO in $H_2$ will make it possible to obtain satisfactory results.

Furthermore, these active gases can be mixed with carrier gases for example, for reasons of storage or transportation. Nitrogen or argon, for example, will be chosen.

In the case where the metal M1 is platinum and the metal M2 is palladium, the first condition imposed on the thermodynamic equilibrium potentials is adhered to when hydrogen or a mixture of hydrogen and carbon monoxide is used as reducing gas as the equilibrium potential of the $H^+/H_2$ pair is 0 V and the equilibrium potential of the $CO_2/CO$ pair is −0.11 V, whereas the thermodynamic equilibrium potential of the $Pd^{2+}/Pd$ pair is 0.95 V.

Thus, in the case where the reducing gas chosen to reduce the M2 metal salt is hydrogen or a mixture of hydrogen and carbon monoxide, only the metals having positive thermodynamic equilibrium potentials can be chosen.

The second condition, in the case when M2 is palladium and M1 is platinum, is also adhered to when the platinum salt used is $H_2PtCl_6$. This is because the thermodynamic equilibrium potential of the $PtCl_6^{2-}/Pt$ pair is 0.76 V, that is to say less than the equilibrium potential of the $Pd^{2+}/Pd$ pair.

More specifically, in order to cause the platinum seeds to grow on the palladium, that is to say in order for the platinum in solution to be able to crystallize on the palladium seeds, it is necessary to cross an energy barrier known as overvoltage.

This overvoltage has the value $\eta = E - E_{PtCl_6^{2-}/Pt}^{eq}$, where $E$ is the electrode potential measured and $E_{PtCl_6^{2-}/Pt}^{eq}$ is the thermodynamic equilibrium potential of the $PtCl_6^{2-}/Pt$ pair. In the case of a reduction, $E$ must be less than $E_{PtCl_6^{2-}/Pt}^{eq}$ in order for $PtCl_6^{2-}$ to be reduced to Pt.

The lower the electrode potential $E$ applied, the faster the reaction. However, in this case, there is a risk of agglomeration of the platinum particles and, furthermore, if the electrode potential is less than 0 V, there is a risk of the predominant reaction being the reduction of $H^+$ to $H_2$.

Rather than applying a potential, it is also possible to apply a current. By applying a negative current, that is to say a reduction current, the reduced form of $PtCl_6^{2-}$ is favored. Just as in the case of a deposition controlled by the potential, highly negative current values will result in low potentials with the same disadvantages as those mentioned for negative potentials.

The presence of palladium seeds makes it possible to reduce the overvoltage necessary to promote the nucleation and the growth of the platinum particles, which then takes place predominantly on the palladium as the energy barrier is lower there than on the carbon. Since the palladium was formed by contact between the gas $H_2$ or $H_2+CO$ and the electrolyte comprising the palladium salt, the growth of platinum on these seeds satisfies the contact between the gas and the electrons. Thus, with the process for the deposition of a metal M1 on a layer of porous carbon according to the invention, more particularly the process for the deposition of platinum on a layer of porous carbon according to the invention, the cost of the fuel cells comprising electrodes obtained by using the deposition process of the invention is reduced as the platinum is localized at very active sites of the electrode. It will be repeated here that active site is understood to mean sites where the catalyst is simultaneously in contact with the protons ($H^+$), the electrons and the gases ($O_2$).

To sum up, whether for bimetallic alloys or platinum catalysts, the process for the deposition of a metal M1 on a layer of porous carbon according to the invention consists in reducing a salt of a metal M2 with a reducing gas, preferably hydrogen or a mixture of hydrogen and carbon monoxide. It will be repeated that the advantage of the use of a hydrogen+carbon monoxide mixture in comparison with pure hydrogen lies in the property of carbon monoxide of being absorbed on the platinum or the palladium and thus of controlling the growth of the palladium particles. Consequently, the chemical reduction with carbon monoxide makes it possible to obtain a better dispersion of the palladium seeds and thus smaller palladium particles. The second step of the process of the invention is the pulse potential or pulse current electrochemical deposition of the catalyst, in this instance platinum.

In order to make sure that the platinum is reduced predominantly on the palladium seeds rather than on the carbon, the signal applied is a low-current or low-overvoltage signal. In both these cases, the low over-voltages generated by these signals force the electrochemical deposition onto the sites of lowest resistance, that is to say onto the palladium seeds rather than onto the carbon, for which greater over-voltages are necessary.

In order to make the invention better understood, an implementational example thereof will be described, as purely illustrative and nonlimiting example.

Example 1: Manufacture of a Half Fuel Cell

A commercial diffusion layer GDL (Gas Diffusion Layer) of Elat LT 1200 type with an area of 25 $cm^2$ is treated by spraying an ink composed of 10 mg of carbon particles, of 2 ml of water and of 2 ml of isopropanol and of 5 mM $PdCl_2$ dissolved in 0.5M $H_2SO_4$. This step makes it possible to introduce the palladium metal seeds in ionic form and to render hydrophilic the surface of the commercial diffusion layer, an essential property for the following phase of electrochemical deposition.

The choice of palladium is related to the fact that the $Pd^{2+}/Pd$ equilibrium potential is positive and thus that the palladium ions are readily reduced by $H_2$ from a thermodynamic viewpoint.

This is because, contrary to $Cu^{2+}$, the thermodynamic equilibrium potential of the $Pd^{2+}/Pd$ pair is greater than the equilibrium potential of the $PtCl_6^{2-}/Pt$ pair, which means that ion exchange between the platinum and palladium ions cannot take place, as is the case between the copper and platinum ions.

The diffusion layer obtained is placed in an electrochemical deposition cell. This cell makes it possible to introduce the reducing gas through the diffusion layer and consequently the palladium metal nanoparticles are formed only in the areas accessible to the gas.

Subsequently, electrochemical reduction is provided by an electrolytic solution composed of 2 mM $H_2PtCl_6$ diluted in 0.5M sulfuric acid. The signal applied is cyclic, 250 cycles at 200 mV/s between 0.8 V and 0.5 V/SHE (standard hydrogen electrode). From the first cyclic voltammetry cycles, the curve characteristic of platinum is observed, thus showing the greater aptitude to reduce the platinum on the palladium seeds than directly on the GDL.

The diffusion electrode directly obtained is assembled with a membrane composed of a proton-exchange polymer solution, for example made of Nafion®, NR212, in order to obtain a half cell. This assembling is carried out under low pressure (<0.5 MPa) at 135° C. for 2 min 30 and then under a pressure of 3.5 MPa at 135° C. for 3 min 30. A commercial electrode is pressed in the same way in order to obtain a commercial half cell.

The invention claimed is:

1. A process for preparing an electrode wherein said process comprises the following steps:
    depositing a metal M2 on a layer made of porous carbon by chemical reduction of a salt of said metal M2 using a reducing gas such that said metal M2 is deposited as a discontinuous layer of metal seeds of metal M2 on said porous carbon layer, and
    then depositing a metal M1 by electrochemical reduction of an electrolytic solution of a salt of the metal M1, the thermodynamic equilibrium potential between the ionic form of the salt of M1 and metal M1, $E^{eq}_{ionic\ form\ of\ the\ salt\ of\ M1/M1}$, being lower than the thermodynamic equilibrium potential the ionic form of the salt of metal M2 and M2, $E^{eq}_{ionic\ form\ of\ the\ salt\ of\ M2/M2}$, so that said metal M1 is deposited only onto the seeds of metal M2,
    so that said M1 and said metal M2 are deposited only at sites accessible to gases, and electrons and protons and said metal M1 is platinum and said metal M2 is palladium.

2. The process as claimed in claim 1, characterized in that the reducing gas comprises hydrogen $H_2$ or carbon monoxide CO.

3. The process as claimed in claim 1, characterized in that the reducing gas comprises $H_2+CO$.

4. The process as claimed in claim 2, characterized in that the reducing gas is used as a mixture with a carrier gas chosen from $N_2$ or Ar or a mixture of these.

5. A process for the manufacture of a fuel cell electrode, the process comprising:
   a step of providing a gas diffusion layer;
   forming a porous carbon layer on the gas diffusion layer; and
   depositing a metal M1 which is platinum on the layer made of porous carbon according to the process claimed in claim 1 to form a fuel cell electrode.

6. A process for the manufacture of a fuel cell further comprising the step of assembling the fuel cell electrode of claim 5 with a membrane comprising a proton-exchange polymer.

7. The process of claim 1, further comprising the step of forming a membrane layer on the electrode.

8. The process of claim 1, wherein the porous carbon layer is deposited on a diffusion layer.

* * * * *